United States Patent
DeMirza

(10) Patent No.: US 9,398,988 B1
(45) Date of Patent: Jul. 26, 2016

(54) HUMAN POWERED WHEELCHAIR WITH JACKDRIVE™ PROPULSION SYSTEM

(71) Applicant: Philippe Joel DeMirza, Butner, NC (US)

(72) Inventor: Philippe Joel DeMirza, Butner, NC (US)

(73) Assignee: JACKDRIVE™ WHEELCHAIR SYSTEM, LLC., Cary, NC (US)

(*) Notice: Subject to any disclaimer, the term of this patent is extended or adjusted under 35 U.S.C. 154(b) by 0 days.

(21) Appl. No.: 14/726,676

(22) Filed: Jun. 1, 2015

(51) Int. Cl.
*A61G 5/02* (2006.01)
*A61G 5/10* (2006.01)
*B62M 1/16* (2006.01)

(52) U.S. Cl.
CPC ............... *A61G 5/025* (2013.01); *A61G 5/022* (2013.01); *A61G 5/028* (2013.01); *A61G 5/1035* (2013.01); *B62M 1/16* (2013.01)

(58) Field of Classification Search
CPC ............... A61G 5/021–5/023; A61G 5/025; B62M 1/16
See application file for complete search history.

(56) References Cited

U.S. PATENT DOCUMENTS

| | | | |
|---|---|---|---|
| 4,705,284 A | 11/1987 | Stout | |
| 4,811,964 A * | 3/1989 | Horn | A61G 5/023 188/2 F |
| 5,007,655 A * | 4/1991 | Hanna | A61G 5/023 280/245 |
| 5,209,506 A | 5/1993 | Klopfenstein | |
| 5,632,499 A * | 5/1997 | Hutcherson | A61G 5/023 280/246 |
| 5,865,455 A * | 2/1999 | Taylor | A61G 5/025 188/2 F |
| 6,158,757 A * | 12/2000 | Tidcomb | A61G 5/023 280/244 |
| 6,234,504 B1 * | 5/2001 | Taylor | A61G 5/023 280/250.1 |
| 6,715,780 B2 * | 4/2004 | Schaeffer | A61G 5/025 280/248 |
| 6,820,885 B1 * | 11/2004 | Oshimo | A61G 5/025 280/243 |
| 6,916,032 B2 * | 7/2005 | Wong | A61G 5/023 280/242.1 |
| 7,344,146 B2 * | 3/2008 | Taylor | A61G 5/023 280/242.1 |
| 8,087,684 B2 * | 1/2012 | Bloswick | A61G 5/023 280/250.1 |
| 8,348,293 B1 * | 1/2013 | Lasher | A61G 5/10 16/30 |
| 8,844,959 B2 * | 9/2014 | Winter | B62M 3/00 280/244 |
| 2008/0073869 A1 * | 3/2008 | Patterson | A61G 5/023 280/244 |

FOREIGN PATENT DOCUMENTS

FR EP 2186496 A1 * 5/2010 ............... A61G 5/10

* cited by examiner

Primary Examiner — Kevin Hurley
(74) Attorney, Agent, or Firm — Peter J. Rashid

(57) ABSTRACT

A human powered wheelchair includes a frame, a seat mounted to the frame for supporting an operator having a torso, two independently driven wheels disposed at the rear of the wheelchair, and a JACKDRIVE™ propulsion system. The JACKDRIVE™ propulsion system includes two independent drive levers adapted to be grasped by the operator and to be pushed forward in a bench press movement away from the torso of the operator, a biasing member for exerting a biasing force to move each lever toward the torso of the operator, a driving chain connected to each lever, and a unidirectional driving mechanism operatively coupled to the driving chain and each driven wheel for directly translating the bench press movement of each lever into unidirectional motion of each driven wheel so as to propel the wheelchair in a forward direction.

28 Claims, 4 Drawing Sheets

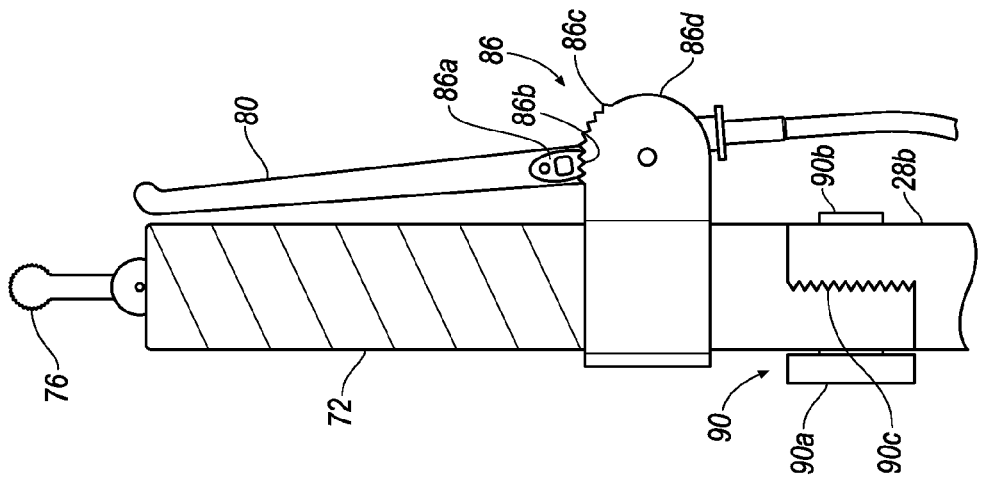
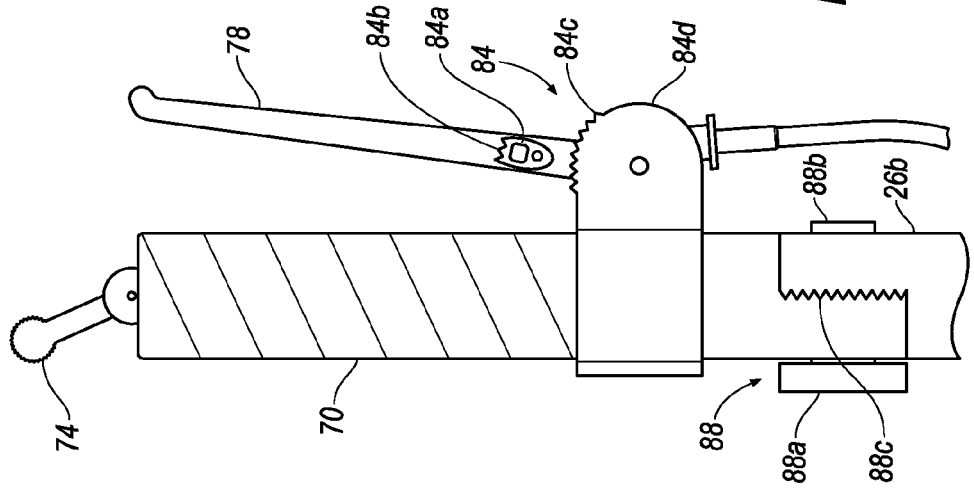

HUMAN POWERED WHEELCHAIR WITH JACKDRIVE™ PROPULSION SYSTEM

FIELD OF THE INVENTION

The invention pertains, in general, to a human powered wheelchair, and more particularly to a human powered wheelchair with a JACKDRIVE™ propulsion system for propelling the wheelchair by use of an operator's arms and torso.

BACKGROUND OF THE INVENTION

Over the past three centuries, wheelchairs have been used by individuals whose legs are not capable of functioning normally or are absent. Many of these individuals are otherwise active and healthy members of society. However, due to their nonfunctioning, or absent legs, they are not able to participate in activities that require locomotion by use of the legs.

Beyond the common wheelchair, there has opened up in recent years a category of human-powered vehicles for handicapped riders, developed around wheelchair sports applications. Two styles have emerged: one is a variation on the conventional wheelchair, in which the rider pushes with the hands directly onto rings attached to the main wheels; and the other, typically referred to as a "handcycle", derives from the bicycle, but with additional wheels, and the driving pedals moved to within reach of the hands. There are a number of disadvantages to both of these styles which render them unsuitable for either daily outdoor transportation, or for casual, recreational use, in the way that an able-bodied person might use an ordinary bicycle. Neither style is particularly well suited to the human form in terms of the ergonomic factors of efficient muscle use, strain avoidance, and overall rider comfort. By and large, they are adaptations of designs which have been optimized over time, for other purposes, or other muscle groups. Therefore, it is desirable to provide a wheelchair that overcomes the shortcomings of the prior art.

SUMMARY OF THE INVENTION

The present invention attempts to solve the foregoing problems by configuring a human powered wheelchair with a JACKDRIVE™ propulsion system that uses a bench press movement that maximizes the amount of sustained power that can be extracted from the rider's arms and upper torso. The JACKDRIVE™ propulsion system also provides the operator therapeutic movement and the ability to exercise in order to strengthen operable muscles and promotes blood flow that is a recurring issue with paralyzation. The JACKDRIVE™ propulsion system can be easily retrofit to existing wheelchair designs, thereby allowing the JACKDRIVE™ wheelchair system to be available to the public at relatively low cost.

To achieve movement, the back is pressed against a firm seat. The hands and arms extend out from the chest level using a bench press movement against two drive handles to facilitate a vast increase in thrust as compared to conventional wheelchair propulsion designs. This bench press movement, coupled with a multi-geared transmission on each driven rear wheel, facilitate bicycle simulated performance and ease. Steering is achieved through independent thrust and/or braking through the drive handles and hand brakes. Shifting of the gears is achieved through a thumb shifter on both of the drive handles. A neutral gear on each of the two transmissions facilitates reverse capability for in-house or tight quarter maneuvering. The retractable design of the drive handles offers the utilization of conventional wheelchair propulsion when in such spaces. Drive handles operate by pulling a chain through a typical bicycle transmission with springs designed to maintain tension with the sprocket and derailleur, thereby creating optimum movement.

In one aspect, a human powered wheelchair includes a frame, a seat mounted to the frame for supporting an operator having a torso, two independently driven wheels disposed at the rear of the wheelchair, and a JACKDRIVE™ propulsion system. The JACKDRIVE™ propulsion system includes two independent drive levers adapted to be grasped by the operator and to be pushed forward in a bench press movement away from the torso of the operator, a biasing member for exerting a biasing force to move each lever toward the torso of the operator, a driving chain connected to each lever, and a unidirectional driving mechanism operatively coupled to the driving chain and each driven wheel for directly translating the bench press movement of each lever into unidirectional motion of each driven wheel so as to propel the wheelchair in a forward direction.

These and other objects of the present invention will become more fully apparent by examination of the following description of the preferred embodiments and the accompanying drawings.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 5 is an enlarged end view of the drive handle and articulating hinge of the upper portion of the drive lever when the brake lever is not in a parking position; and FIG. 6 is s an enlarged end view of the drive handle and articulating hinge of the upper portion of the drive lever when the brake lever is in a parking position.

DETAILED DESCRIPTION OF THE INVENTION

Figure 1:
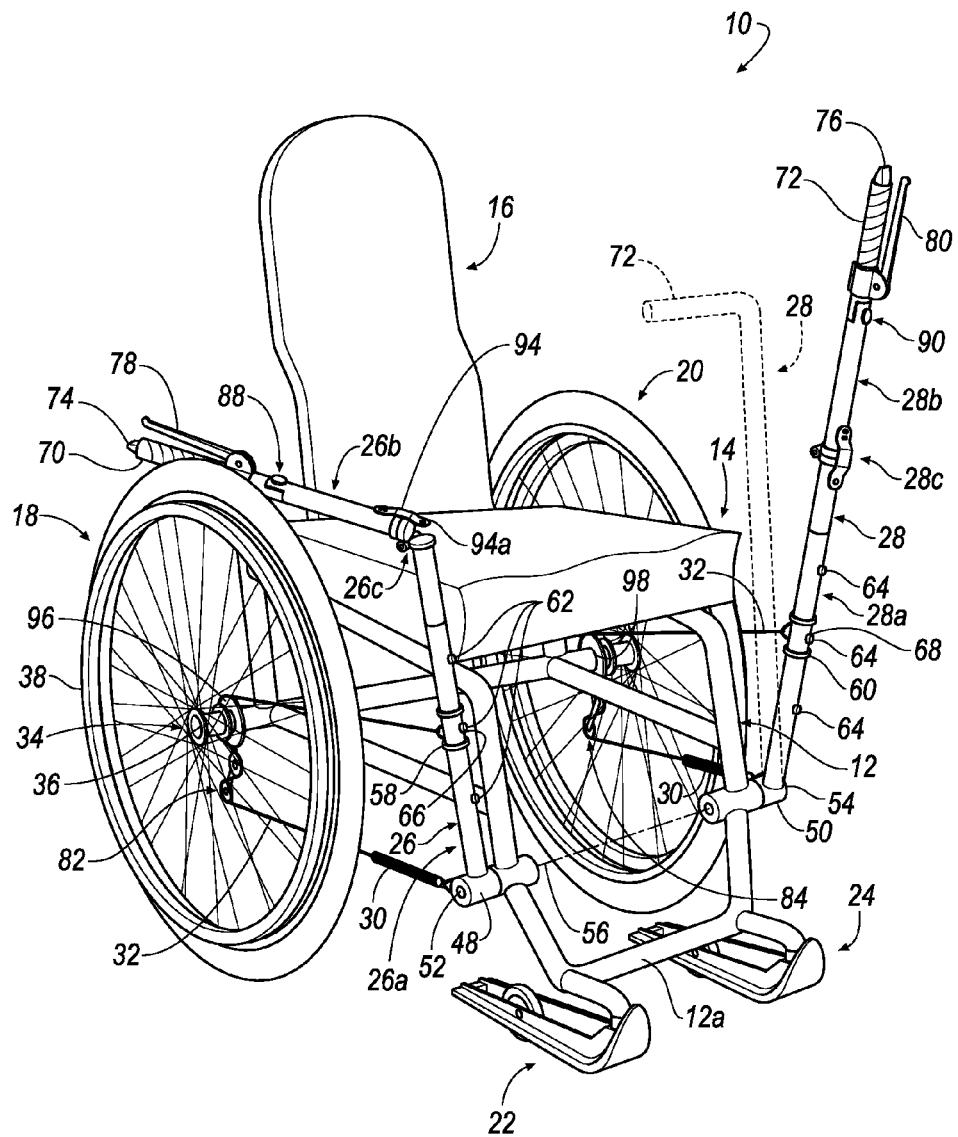
FIG. 1 is a perspective view of a human powered wheelchair with a JACKDRIVE™ propulsion system in accordance with an embodiment of the invention.

Referring to FIG. 1, a human powered wheelchair with JACKDRIVE™ propulsion system is shown generally at 10 according to an embodiment of the invention. The JACKDRIVE™ is a trademark of JACKDRIVE WHEELCHAIR SYSTEM located in Cary, N.C. The wheelchair 10 of the invention is generally termed as a human powered wheelchair that is principally concerned with providing a more efficient design of a wheelchair to be used as an all-terrain wheelchair with a JACKDRIVE™ propulsion system for individuals afflicted with paraplegia. However, it will be appreciated that the wheelchair 10 of the invention could be used as practical transportion.

In general, the wheelchair 10 includes a frame 12 that is constructed using methods and made of materials that are well known to those familiar in such arts as wheelchair or bicycle frame fabrication. However, because both strength, weight and rigidity of the frame are important considerations, those who are skilled in the design and fabrication of wheelchair and/or bicycle frames are particularly well versed in the materials and methods advantageous for use in the present invention. The frame 12 includes a horizontal support member 12a that acts as a footrest for a non-amputee. The horizontal support member 12a can be located at any desirable location on the frame 12 to allow the occupant easy access in and out of the wheelchair 10. Alternatively, the frame 12 may include a conventional footrest mounted to the frame 12 at the appropriate location.

As just mentioned, it is important that the frame 12 be lightweight so as to require a minimum amount of effort to accelerate the wheelchair 10. Further, the frame 12 must be strong enough so as to withstand the stresses placed upon it during operation. Yet another consideration is the rigidity of the frame 12. While a frame may be strong enough to withstand the expected stresses without permanent deformation, if the frame flexes excessively, then an undue amount of effort of the operator is absorbed by the frame 12, rather than used for propelling the wheelchair 10. Conversely, a frame that is too stiff may create an uncomfortable ride for the operator. The proper combination of weight, strength, and rigidity can be determined according to the particular application, and the particular operator, for which the wheelchair is designed.

The materials from which the frame 12 may be fabricated include many materials commonly used for fabrication wheelchair and/or bicycle frames. These materials include low carbon steel alloys or sophisticated high strength steel alloys, titanium and aluminum alloys, as well as graphite fibers and other materials that may be found to have suitable characteristics. In another example, the frame 12 can be made of welded chromalloy, or similar strong, lightweight tubing. In yet another example, the frame 12 can be made of Acrylonitrile Butadiene Styrene (ABS) plastic, and the like. It will be appreciated that to obtain the goals of the design, the use of many different frame styles and materials is possible, including stamped and formed frame members, or molded composites such as kevlar or carbon fiber. Welded tubing is preferred in this instance for its simplicity of construction and widespread availability.

The wheelchair 10 includes a seat 14 for supporting the operator (not shown). Because the operators of the invention will generally be paraplegics, or lower limb amputees, the seat 14 should provide proper support to hold the individual in the correct operating position. In the illustrated embodiment, the seat 14 is of a bucket seat of a type that is found in conventional wheelchairs. The seat 14 can have a bottom layer made of a relatively hard material and a top layer made of a relatively softer material. It will be realized that individuals that have lost their lower limbs may require a different seat design that those who have merely lost the use of those limbs. However, the basic bucket seat design seems suitable for both types of individuals with some modifications for each. However, some individuals may express a preference for a "sling" type seat. In such a seat, a flexible material is stretched between two rods along the outer edges of the material, such as is found in many conventional wheelchairs. A harness (not shown) may also be provided. The harness may consist of a single strap that fits around the waist of the operator or a more complex shoulder, chest, or waist harness.

Because the operator of the wheelchair 10 is in many cases able to use their torso muscles, as well as the muscles in their arms, to propel the vehicle, a backrest 16 may also be provided. A suitable backrest 16 greatly assists the operators when exerting a pushing action with their arms. In the illustrated embodiment, the backrest 16 has a suitable height and stiffness to provide adequate support for pushing in a power stroke using a bench press movement of the arms. For example, the backrest 16 can have a bottom layer made of a relatively hard material and a top layer made of a relatively softer material.

In the illustrated embodiment, the two driven wheels 18, 20 are disposed at the rear of the wheelchair 10 and rotatably mounted to an axle 36. The driven wheels 18, 20 are wheels found on conventional wheelchairs that include a push ring 38 that allow the user to propel the wheelchair 10 in a conventional manner. This may occur, for example, when the wheelchair 10 of the invention is to be propelled inside close quarters, such as a house, and the like.

Figure 2:
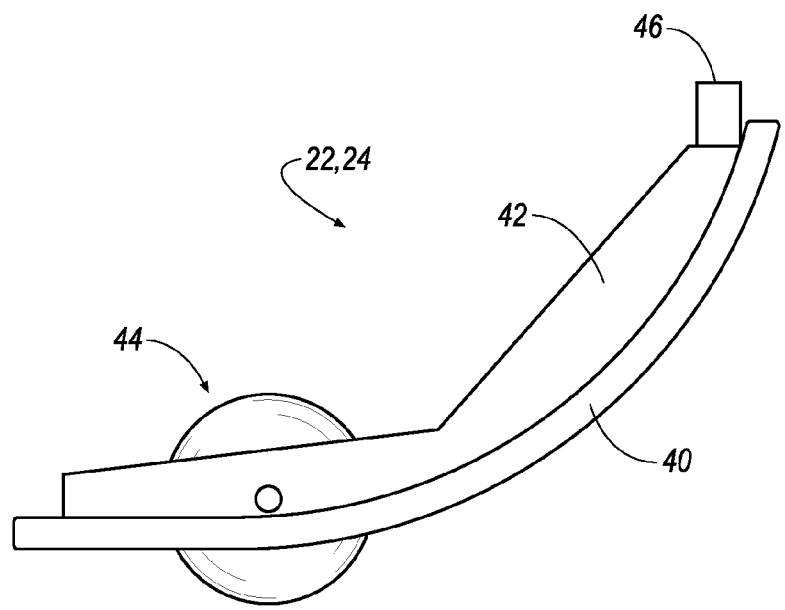
FIG. 2 is a side view of the skids of the wheelchair according to an embodiment of the invention.
Figure 3:
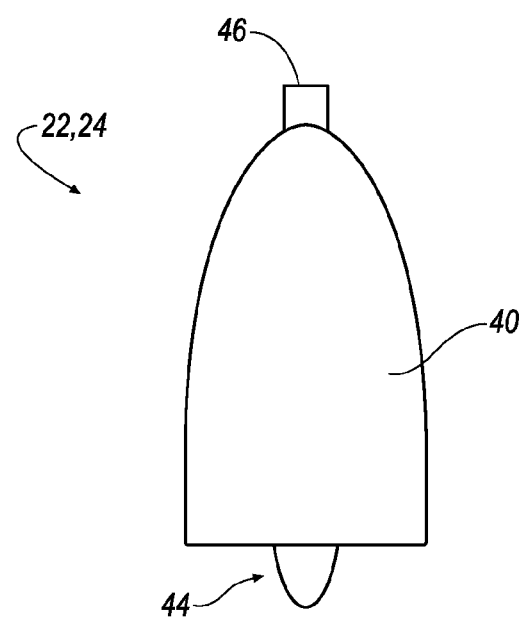
FIG. 3 is an end view of the skids shown in FIG. 2.

The pair of skids 22, 24 are disposed at the front of the wheelchair 10. The skids 22, 24 replace the wheels found in conventional wheelchairs and allow the wheelchair to be used over varied terrain, such as grass, gravel, sand, and the like. As shown in FIGS. 2 and 3, each skid 22, 24 includes a bottom plate 40 mounted to a frame member 42. The bottom plate 40 may of a suitable, durable material for all-terrain use, such as carbon fiber, Acrylonitrile Butadiene Styrene (ABS) plastic, and the like. The frame member 42 can be made of the same material as the frame 12. For example, the frame member 42 can be made of Acrylonitrile Butadiene Styrene (ABS) plastic, and the like. The bottom plate 40 has a general shape of a ski, but is much shorter in length. Each skid 22, 24 also includes a roller blade wheel 44 rotatably mounted to the frame member 42 for providing excellent mobility of the wheelchair 10 over smooth terrain, such as sidewalks, parking lots, and the like. The skids 22, 24 can be easily mounted to a conventional wheelchair by attaching the frame member 42 to an existing post 46 found in conventional wheelchairs. The skids 22, 24 are attached to the post 46 in such a way to allow the skids 22, 24 to freely pivot in a 360 degree manner in the same manner as a conventional caster.

Referring back to FIG. 1, one aspect of the invention is that the wheelchair 10 is propelled by the operator using a JACKDRIVE™ propulsion system by moving two drive levers 26, 28 in the forward direction in a bench press movement. In general, the JACKDRIVE™ propulsion system includes two independent drive levers 26, 28, a biasing member 30, a driving chain 32 connected to each drive lever 26, 28, and a unidirectional driving mechanism 34.

The two drive levers 26, 28 are adapted to be grasped by the operator (not shown) and to be pushed in a bench press movement away from the torso of the operator to a first position. Conversely, the biasing member 30 exerts a biasing force to move each drive lever 26, 28 toward the torso of the operator. In the illustrated embodiment, the biasing member 30 comprises a compression spring. However, the biasing member 30 may comprise any suitable mechanism that can exert a biasing force to move each drive lever 26, 28. For example, the biasing member 30 may comprise a hydraulic piston, and the like. In FIG. 1, the drive lever 28 is shown in the first position, while drive lever 26 is shown in the second position.

Figure 4:
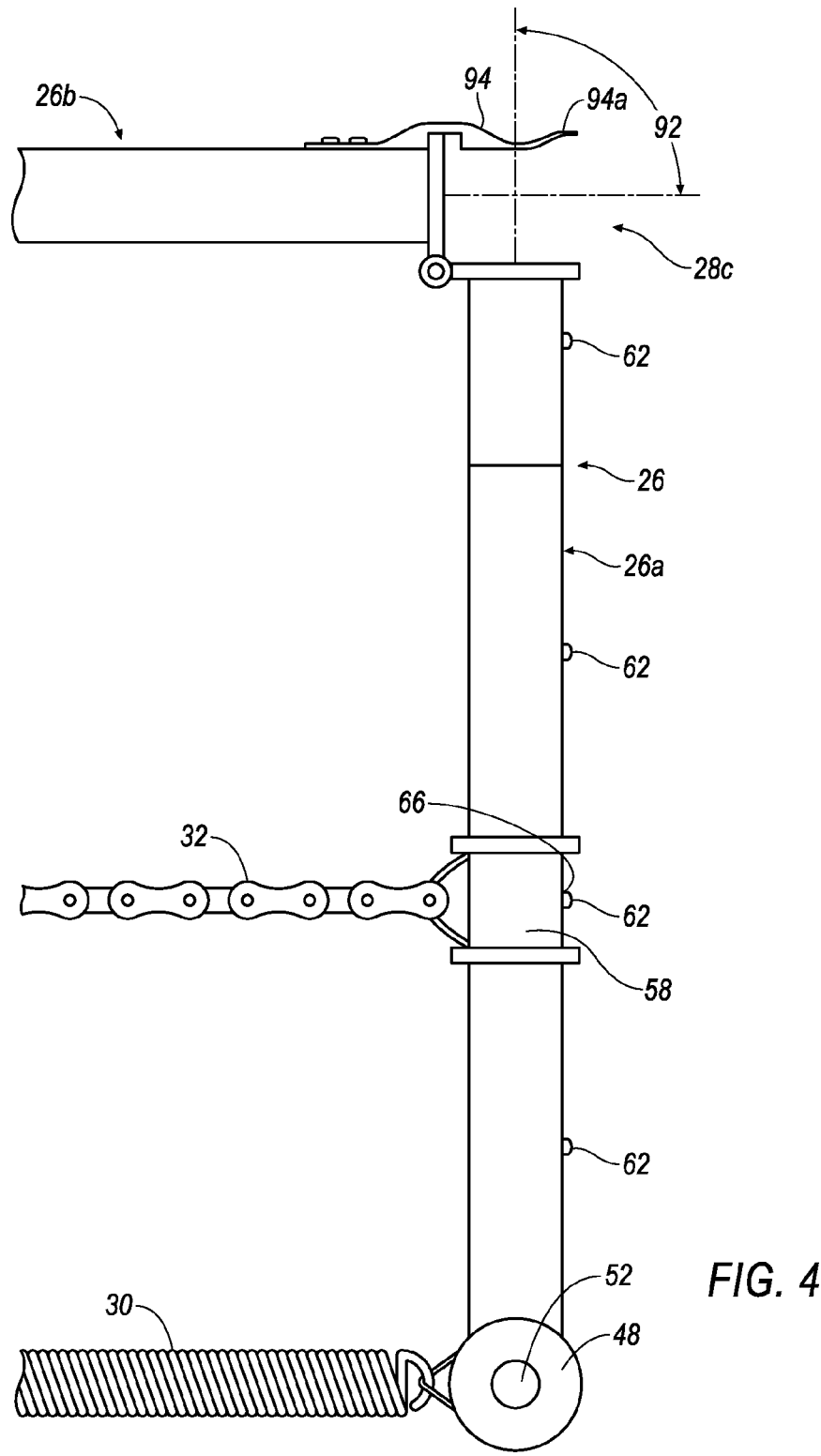
FIG. 4 is an enlarged end view of the lower portion with hinge and sliding collar of the drive lever shown in FIG. 1.

As shown in FIGS. 1 and 4, each drive lever 26, 28 includes a lower portion 26a, 28a, an upper portion 26b, 28b and a hinge 26c, 28c for allowing the upper portion 26b, 28b to pivot about the hinge 26c, 28c. The end of the lower portion 26a, 28a of each drive lever 26, 28 is attached to a frame member 48, 50 that is pivotally mounted to the frame 12 by a pivot pin 52, 54, respectively, such that each drive lever 26, 28 is pivoted about a common axis 56. It is noted that FIG. 4 only shows the right drive lever 26, but it should be appreciated that the right drive lever 26 shown in FIG. 4 can also applied to the left drive lever 28.

Each drive lever 26, 28 includes a collar 58, 60 slidingly disposed over the lower portion 26a, 28a for allowing a leverage point to be selected by the operator. The leverage point defines the length of the lever arm, and therefore the amount of energy needed to push each drive lever 26, 28 in a direction away from the torso when the operator is seated in the wheelchair 10. In addition, the selection of the leverage point determines the ratio of the distance that the drive levers 26, 28 travel and the distance travelled by the driving wheels 18, 20. Thus, the selection of a leverage point by the operator also determines the "mechanical advantage" provided by the wheelchair 10. When using the term "mechanical advantage", it is generally meant to refer to the ratio between the distance that the drive levers 26, 28 travel and the distance travelled by the driving wheels 18, 20.

The collar 58, 60 can be positioned at a plurality of locations along the lower portion 26a, 28a, by inserting a spring-loaded pin 62, 64 into an opening 66, 68 in the collar 58, 60. In the illustrated embodiment, each lower portion 26a, 28a has three (3) pins 62, 64 for providing three (3) leverage points that can be selected by the operator to select the mechanical advantage provided by the unidirectional drivetrain mechanism 34. It is realized that the highest leverage point is selected by positioning the collar at the highest pin location (i.e. distal the end of the lower portion 26a, 28a), and the lowest leverage point is selected by positioning the collar 58, 60 at the lowest pin location (i.e. proximate the end of the lower portion 26, 28). For example, the collar 58, 60 can be positioned on the lower leverage point when the wheelchair 10 is traveling over rough terrain and/or traveling up an inclined surface. In another example, the collar 58, 60 can be positioned on the highest leverage point when the wheelchair 10 is traveling over smooth terrain and/or traveling down an inclined surface. In yet example, the collar 58, 60 can be positioned on the middle leverage point during normal use. It will be appreciated that the invention is not limited by the number of pin locations for providing different leverage points, and that the invention can be practiced with any desirable number of leverage points by adding or subtracting the number of spring-loaded pins 62, 64 on each drive lever 26, 28.

The upper portion 26b, 28b of each drive lever 26, 28 includes a drive handle 70, 72, a shift control 74, 76, and a brake lever 78, 80. The shifts controls 74, 76 are mounted in a convenient location to allow the occupant to select the desired gear. The shift control 74 controls a right rear derailleur 82 to allow the occupant to select the desired gear, while the shift control 76 control a left rear derailleur 84 to allow the occupant to select the desired gear. The derailleurs 82, 84 are commercially available and are very familiar to those well-versed in the bicycle art design. In addition, the number of gears that can be selected by the occupant can be any desirable number that are commercially available to those well-versed in the bicycle art design. The desired gears on the right rear derailleur 82 and the left rear derailleur 84 can be independently selected by the occupant.

It will be appreciated that the selection of the position of the collars 58, 60 on the drive levers 26, 28 and the selection of the gear using the shift controls 74, 76 provide a large of amount of flexibility to determine the amount of torque or moment of force exerted by the drive levers 26, 28 on the drive wheels 18, 20. As mentioned above, the selection of the leverage point by the collars 58, 60 and the selection of the gear by the shift controls 74, 76 acts in a manner similar to a conventional bicycle gear mechanism to determine the mechanical advantage provided by the drive levers 26, 28.

The brake levers 78, 80 operate caliper brakes (not shown) that are commercially available and are very familiar to those well-versed in the bicycle art design. It will be appreciated that the invention is not limited by the type of brakes, and that the invention can be practiced with any desirable type of brake, such as cantilever brakes, disk brakes, and the like. The brake levers 78, 80, along with the opposite drive lever 26, 28 begin pushed forward, assists the occupant in steering the wheelchair 10. For example, the right brake lever 78 may be applied and the drive lever 28 pushed forward to assist the occupant in steering the wheelchair 10 to the right. Similarly, the left brake lever 80 may be applied and the drive lever 26 pushed forward to assist the occupant in steering the wheelchair 10 to the left. It should be noted that the wheelchair 10 of the invention has superior maneuverability. For example, by applying the right brake lever 78 such that the right rear wheel 18 is prevented to rotate and continuously moving the left drive lever 28 in a reciprocating motion will cause the wheelchair 10 to rotate about the right rear wheel 18 in a full circle.

Referring now to FIGS. 5 and 6, each brake lever 78, 80 includes a parking brake mechanism, shown generally 84, 86, respectively, for positioning the brake lever 78, 80 in a parking brake position, if desired. In FIG. 5, the brake lever 78 is not positioned in the parking brake position, while in FIG. 6, the brake lever 80 is positioned in the parking brake position. In the illustrated embodiment, each parking brake mechanism 84, 86 includes a latch member 84a pivotably mounted of a respective brake lever 84, 86 and having a plurality of teeth 84b that are capable of interlocking with a plurality of teeth 84c on a support member 84d. To position the brake lever 86 in the parking brake position, as shown in FIG. 6, the occupant presses the brake lever 86 toward the drive handle 72 and pivots the latch member 86a until the teeth 86b interlock with the teeth 86c on the support member 86d. Conversely, the brake lever 86 can be released from the parking brake position by pressing the brake lever 86 toward the drive handle 72 and pivots the latch member 86a such that the teeth 86 no longer interlock with the teeth 86c on the support member 86, as shown in FIG. 5.

Each drive handle 70, 72 is attached to the upper portion 26b, 28b of each drive lever 26, 28 by an articulating hinge 88, 90, respectively. Each articulating hinge 88, 90 includes a thumbwheel 88a, 90a and a threaded shaft 88b, 90b inserted through upper portion 26b, 28b of each drive lever 26, 28. The rotation of the thumbwheel 88a, 90a in one direction, for example, in the counterclockwise direction causes interlocking teeth 88c, 90c of the articulating hinge 88, 90 to disengage one another such that the drive handle 70, 72 can be pivoted to a desired angle with respect to the upper portion 26, 28b of the drive lever 26, 28.

In the illustrated embodiment shown in FIGS. 5 and 6, the angle is zero degrees (i.e., the drive handles 70, 72 are parallel to the upper portion 26b, 28b). However, it will be realized that it is desirable for the occupant to position each drive handle 70, 72 between an angle of +90 degrees and −90 degrees with respect to upper portion 26b, 28b, to facilitate movement of each drive lever 26, 28 with a bench press type movement, similar to the bench press type movement in weight lifting exercise. For example, each drive handle 70, 72 can be moved ninety (90) degrees inward (i.e. each drive handle 70, 72 points toward each other). In another example, each drive handle 70, 72 can be moved ninety (90) degrees outward (i.e. each drive handle 70, 72 points away from each other). In addition, each drive handle 70, 72 can be positioned at any desirable angle between +90 degrees and −90 degrees with respect to the upper portion 26b, 28b.

Referring back to FIGS. 1 and 4, the hinge 26c separating the lower portion 26a, 28a and the upper portion 26b, 28b of each drive lever 26, 28 allows the upper portion 26b, 28b of each drive lever 26, 28 to be positioned at an angle 92 with respect to the lower portion 26a, 28a. As shown in FIGS. 1 and 4, for example, the upper portion 26b of the right drive lever 26 is pivoted to a non-zero angle 92 of approximately ninety (90) degrees with respect to the lower portion 26a to allow the upper portion 26 of the drive lever 26 to be used as an armrest when use of the JACKDRIVE™ propulsion system is not necessary, such as when using the wheelchair 10 indoors or in close quarters. The upper portion 26b is securely locked at an angle of zero (0) degrees, for example, the left drive lever 28 shown in FIG. 1, by disposing a spring-loaded pin 62, 64 inside an opening 94a of a resilient latch member 94, in a similar manner as the collar 60. This can be easily accomplished by moving each upper portion 26a, 28a in the upward direction until the opening 94a of the resilient latch member 94 snaps into the spring-loaded pin 62, 64, as shown by the left drive lever 28 shown in FIG. 1.

As shown in FIG. 1, the unidirectional driving mechanism 34 is operatively coupled to the driving chain 32 and each driven wheel 18, 20 for directly translating the forward movement of each drive lever 26, 28 into unidirectional motion of each driven wheel 18, 20 so as to propel the wheelchair 10 in a forward direction. To accomplish this, the unidirectional driving mechanism 34 includes a driving freewheel 96, 98 connected to the driving chain 32, which in turn, is connected to each drive lever 26, 28 of the JACKDRIVE™ propulsion system. Each driving freewheel 96, 98 is of the type generally available in the art, which allows the driving freewheel 96, 98 to "rachet" when the wheelchair 10 is coasting in a forward direction, but applies power to the driven wheels 18, 20 when a power stroke is applied on the drive levers 26, 28. The driving freewheels 96, 98 may be custom fabricated or may be modified freewheels that are customarily used in bicycles. Such freewheels can be obtained from a variety of manufacturers and modified for use with the invention. When the term "freewheel" is used herein, it is to be given a meaning similar to that attributed to the term in the art of bicycle design and fabrication. That is, a device that allows free rotation in one direction, but yet does not allow rotation in the opposite direction is generally termed a "freewheel."

In addition, the unidirectional driving mechanism 34 includes a "neutral gear," which is a free spinning gear that rotates on an appropriate bearing structure, to allow the wheelchair 10 to be operated as a conventional wheelchair when the JACKDRIVE™ propulsion system is not in use. The "neutral gear" enables the occupant to move the wheelchair 10 in a forward or reverse direction without using the JACKDRIVE™ propulsion system, similar to a conventional bicycle. Once engaged, the "neutral gear" enables the operator to use the wheelchair 10 in the same manner as a conventional wheelchair by propelling the wheelchair 10 by using the push ring 38. The "neutral gear" is engaged by the occupant using the shift control 74, 76 to cause the derailleur 82, 84 to engage the neutral gear on the driving freewheel 96, 98. In addition, the occupant can push the spring-loaded pin 62, 64 and move the upper portion 26a, 28a of each drive lever 26, 28 to the armrest position described above.

The orientation of the operator and the location in which the operator grasps the drive handles 70, 72 is important in order to achieve maximum energy efficiency during the bench press movement of occupant. Generally, the drive handles 70, 72 are positioned approximately four (4) to eight (8) inches forward of the shoulders before the bench press movement by the occupant to allow the arms of the occupant to fully extent away from the occupant during the bench press movement. In addition, the height of the drive handles 70, 72 are approximately the same height as the shoulders of the occupant when the arms are fully extended in the bench press movement by the occupant such that the large muscle groups in the torso can be used by the occupant.

The unidirectional driving mechanism 34 of the invention provides a mechanical advantage to the operator. When the drive levers 26, 28 are pushed forward by the operator using a bench press movement, the driving freewheels 96, 98 will cause the freewheels 96, 98, and therefore the wheel axle, to rotate in the clockwise direction (as viewed in FIG. 1), thereby propelling the wheelchair 10 in the forward direction.

Up to this point, it should be noted that several components, such as the frame 12, the seat 14, the backrest 16 and the driven wheels 18, 20, are commercially available components found in conventional wheelchairs. Thus, the JACKDRIVE™ propulsion system can be easily retrofit to such conventional wheelchairs by adding the drive levers 26, 28, the biasing member 30, the chain 32 and the unidirectional driving mechanism 34 to the conventional wheelchair. It should be noted that the skids 22, 24 can also be easily added to a conventional wheelchair to convert the conventional wheelchair to an all-terrain wheelchair.

The patents and publications referred to herein are hereby incorporated by reference.

Having described presently preferred embodiments the invention may be otherwise embodied within the scope of the appended claims.

What is claimed is:

1. A human powered wheelchair with a JACKDRIVE™ propulsion system, comprising:
    a frame;
    a seat mounted to the frame for supporting an operator having a torso;
    two independently driven wheels disposed at the rear of the wheelchair; and
    a JACKDRIVE™ propulsion system, comprising:
        two independent drive levers adapted to be grasped by the operator and to be pushed forward in a bench press movement away from the torso of the operator;
        a biasing member for exerting a biasing force to move each drive lever toward the torso of the operator;
        a driving chain connected to each drive lever; and
        a unidirectional driving mechanism operatively coupled to the driving chain and each driven wheel for directly translating the bench press movement of each drive lever into unidirectional motion of each driven wheel so as to propel the wheelchair in a forward direction,
    wherein each drive lever includes a drive handle with a shift control for causing a derailleur to vary the ratio of movement of each lever into unidirectional motion of each driven wheel.

2. The human powered wheelchair according to claim 1, further comprising a pair of skids disposed at the front of the wheelchair to allow the wheelchair to be propelled over varied terrain.

3. The human powered wheelchair according to claim 2, wherein each skid includes a roller blade wheel rotatably mounted to a frame member.

4. The human powered wheelchair according to claim 1, further comprising a collar connected to the driving chain and slidingly mounted on each lever for selectively adjusting a leverage point of each lever.

5. The human powered wheelchair according to claim 1, wherein each drive handle is attached to the upper portion of each drive lever by an articulating hinge.

6. The human powered wheelchair according to claim 5, wherein the articulating hinge includes a thumbwheel and a threaded shaft inserted through the upper portion of each drive lever.

7. The human powered wheelchair according to claim 1, wherein each drive lever includes a brake lever for assisting in steering the wheelchair, the brake lever capable of being latched in a parking brake position.

8. The human powered wheelchair according to claim 1, wherein each driven wheel includes a push ring adapted to be grasped by the operator to propel the wheelchair without the use of the two drive levers.

9. The human powered wheelchair according to claim 1, wherein the unidirectional driving mechanism includes a driving freewheel connected to the driving chain.

10. The human powered wheelchair according to claim 1, wherein each drive lever is attached to a frame member that is pivotally mounted to the frame by a pivot pin such that each drive lever is pivoted about a common axis.

11. A human powered wheelchair with a JACKDRIVE™ propulsion system, comprising:
a frame;
a seat mounted to the frame for supporting an operator having a torso;
two independently driven wheels disposed at the rear of the wheelchair; and
a JACKDRIVE™ propulsion system, comprising:
two independent drive levers adapted to be grasped by the operator and to be pushed forward in a bench press movement away from the torso of the operator;
a biasing member for exerting a biasing force to move each lever toward the torso of the operator;
a driving chain connected to each drive lever; and
a unidirectional driving mechanism operatively coupled to the driving chain and each driven wheel for directly translating the bench press movement of each drive lever into unidirectional motion of each driven wheel so as to propel the wheelchair in a forward direction,
wherein each drive lever includes an upper portion and a lower portion separated by a hinge for allowing the upper portion of each drive lever to be positioned at a non-zero angle with respect to the lower portion.

12. The human powered wheelchair according to claim 11, further comprising a pair of skids disposed at the front of the wheelchair to allow the wheelchair to be propelled over varied terrain.

13. The human powered wheelchair according to claim 12, wherein each skid includes a roller blade wheel rotatably mounted to a frame member.

14. The human powered wheelchair according to claim 11, further comprising a collar connected to the driving chain and slidingly mounted on each drive lever for selectively adjusting a leverage point of each lever.

15. The human powered wheelchair according to claim 11, wherein each drive handle is attached to the upper portion of each drive lever by an articulating hinge.

16. The human powered wheelchair according to claim 15, wherein the articulating hinge includes a thumbwheel and a threaded shaft inserted through the upper portion of each drive lever.

17. The human powered wheelchair according to claim 11, wherein each drive lever includes a brake lever for assisting in steering the wheelchair, the brake lever capable of being latched in a parking brake position.

18. The human powered wheelchair according to claim 11, wherein each driven wheel includes a push ring adapted to be grasped by the operator to propel the wheelchair without the use of the two drive levers.

19. The human powered wheelchair according to claim 11, wherein the unidirectional driving mechanism includes a driving freewheel connected to the driving chain.

20. The human powered wheelchair according to claim 11, wherein each drive lever is attached to a frame member that is pivotally mounted to the frame by a pivot pin such that each drive lever is pivoted about a common axis.

21. A human powered wheelchair with a JACKDRIVE™ propulsion system, comprising:
a frame;
a seat mounted to the frame for supporting an operator having a torso;
two independently driven wheels disposed at the rear of the wheelchair; and
a JACKDRIVE™ propulsion system, comprising:
two independent drive levers adapted to be grasped by the operator and to be pushed forward in a bench press movement away from the torso of the operator;
a biasing member for exerting a biasing force to move each drive lever toward the torso of the operator;
a driving chain connected to each drive lever; and
a unidirectional driving mechanism operatively coupled to the driving chain and each driven wheel for directly translating the bench press movement of each drive lever into unidirectional motion of each driven wheel so as to propel the wheelchair in a forward direction, the unidirectional driving mechanism including a driving freewheel connected to the driving chain,
wherein each drive lever includes a shift control for causing a derailleur to engage a neutral gear on the driving freewheel.

22. The human powered wheelchair according to claim 21, wherein each driven wheel includes a push ring adapted to be grasped by the operator to propel the wheelchair without the use of the two drive levers.

23. The human powered wheelchair according to claim 21, wherein each drive lever includes a drive handle with a shift control for causing a derailleur to vary the ratio of movement of each lever into unidirectional motion of each driven wheel.

24. The human powered wheelchair according to claim 21, wherein each drive lever includes an upper portion and a lower portion separated by a hinge for allowing the upper portion of each drive lever to be positioned at a non-zero angle with respect to the lower portion.

25. The human powered wheelchair according to claim 21, further comprising a collar connected to the driving chain and slidingly mounted on each drive lever for selectively adjusting a leverage point of each lever.

26. The human powered wheelchair according to claim 21, wherein each drive handle is attached to the upper portion of each drive lever by an articulating hinge.

27. The human powered wheelchair according to claim 21, wherein each drive lever includes a brake lever for assisting in steering the wheelchair, the brake lever capable of being latched in a parking brake position.

28. The human powered wheelchair according to claim 21, wherein each drive lever is attached to a frame member that is pivotally mounted to the frame by a pivot pin such that each drive lever is pivoted about a common axis.

* * * * *